Dec. 30, 1958     E. WILDHABER     2,866,354
GEARING WITH TAPERED PINION
Filed May 22, 1956     2 Sheets-Sheet 1

INVENTOR:
Ernest Wildhaber

Dec. 30, 1958 E. WILDHABER 2,866,354
GEARING WITH TAPERED PINION
Filed May 22, 1956 2 Sheets—Sheet 2

INVENTOR:
Ernest Wildhaber

United States Patent Office 2,866,354
Patented Dec. 30, 1958

2,866,354
GEARING WITH TAPERED PINION

Ernest Wildhaber, Brighton, N. Y.

Application May 22, 1956, Serial No. 586,616

9 Claims. (Cl. 74—459.5)

The present invention relates to gearing with tapered pinion and angularly disposed axes, and particularly to gear pairs having angularly disposed and offset axes and comprising a gear and a tapered pinion of smaller outside diameter than said gear. Such gear pairs are used for instance in automotive axles and are known as hypoid gears.

One object of the invention is to devise a tooth shape that permits slight changes in the axial position of the pinion without impairing the conjugacy of the teeth and without displacing the tooth bearing thereon, while also permitting rapid and accurate production together with a smooth surface finish.

It is now customary in automotive axles to provide means for axially adjusting the two members of the gear pair in assembly, to set up the pair exactly. By providing a tooth shape insensitive to axial displacement of the pinion, it is possible to do away with the axial adjustment of the pinion. This simplifies assembly and reduces cost. The only effect of an inaccurate axial pinion setting is then a change in the backlash. The change in backlash increases with increasing taper of the pinion, and, because the pinion is less tapered than the gear and departs less from a cylindrical member, the change in backlash is relatively small and within the permissible range.

Tooth shapes insensitive to an axial displacement of the pinion have been proposed before. One difficulty inherent in the earlier proposal lies in the production of the gear member. The gear was to be hobbed with a hob essentially representing the pinion. On automotive drive gears this meant using a taper hob with a plurality of teeth or starts. Such a hob is costly. But especially its cutting action is poor on hypoid pairs of the usual shaft offsets. Tooth sliding is only moderate, and there is much rolling in addition to sliding. Instead of sweeping cuts, there are only short bites. A smooth surface finish, comparable to that obtained with other methods of production, is unattainable.

The present invention aims to attain such an insensitive tooth shape together with a smooth finish.

A further object is to devise a tooth shape insensitive to axial displacements of the pinion, which permits to form-cut the gear. A still other object is to devise an insensitive tooth shape based on hyperboloidal pitch surfaces, and a tooth shape insensitive to axial pinion displacement where both sides of the teeth have the same pitch lines. Also the tooth surfaces shall be such that the surfaces of action of opposite sides of the teeth intersect in a straight line that follows the tooth zones.

A further object is to devise a tapered pinion containing coaxial helical tooth surfaces of constant axial pitch, said tooth surfaces having a straight profile in planes parallel to and offset from the axis of said pinion.

Other objects will appear in the course of the specification and in the recital of the appended claims.

The objects may be attained singly or in any combination.

Figure 1:
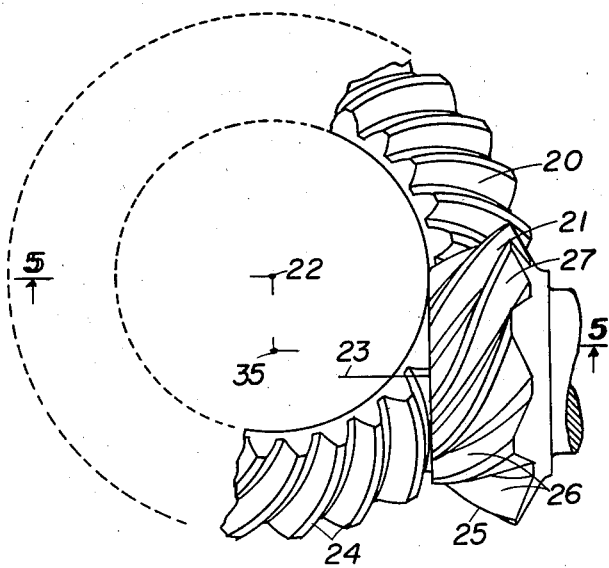
Fig. 1 is a fragmentary view of a hypoid-gear pair constructed according to the present invention, the view being in the direction of the gear axis.

The hypoid-gear pair shown in Fig. 1 comprises a gear 20 and a tapered pinion 21 of smaller outside diameter than said gear. The axes 22 and 23 of the gear and pinion are angularly disposed to and offset from each other.

The drawing shows the axes 22, 23 at right angles to each other, as is general on rear axle drives. However disposition at other than right angles is also feasible.

The spiral teeth 24 of the gear mesh with the spiral teeth 25 of the pinion. The tooth sides 26 of the pinion are coaxial helical surfaces of constant axial pitch, and so are its tooth sides 27, the axial pitch 26a and 27a being different on the two sides. These tooth sides have a straight profile in a plane parallel to and offset from the pinion axis. The gear teeth 24 are conjugate to the pinion teeth 25 and adapted to transmit uniform motion thereto.

Figure 2:
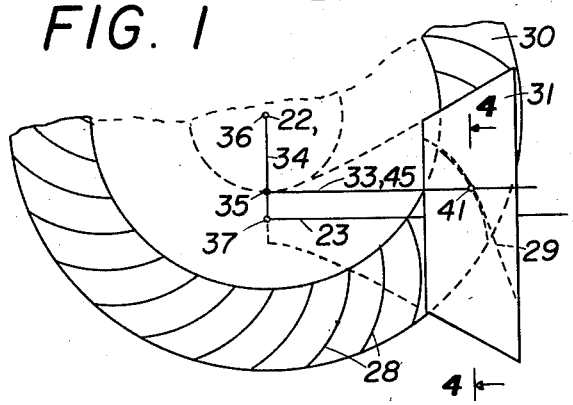
Fig. 2 is a view taken in the same direction as Fig. 1, but showing only the pitch surfaces.

The teeth 24, 25 extend along pitch lines 28, 29 of pitch surfaces 30, 31. Only one pitch line 29 is shown on the pinion for clarity. The pitch surfaces are preferably hyperboloids of revolution coaxial with the axes of the respective gear, see Figures 2 to 4. The said hyperboloids 30, 31 contact one another along a straight-line element 33 that lies in a plane parallel to both axes 22, 23. It is inclined at angles $p'$, $p''$ to the directions of the pinion axis 23 and gear axis 22 respectively, (Fig. 5). the angles $p'$, $p''$ add up to the shaft angle $p$, which is usually a right angle.

Contact element 33 intersects the line of centers 34 at a point 35. The line of centers 34 is understood to be the line that intersects both axes 22, 23 at right angles, at points 36, 37 respectively. It is also the shortest connecting line between the axes 22, 23.

The angles $p'$, $p''$ and offsets $E'=35$—$37$, $E''=35$—$36$ and $E=36$—$37$ cannot all be chosen at will, but have to be interrelated, to make line 33 a contact line between the pitch surfaces. The following known relations exist:

$$E' = \frac{E \tan p'}{\tan p' + \tan p''}; \quad E'' = \frac{E \tan p''}{\tan p' + \tan p''} \quad (1)$$

And for right shaft angles:

$$E' = E \sin^2 p'; \quad E'' = E \cos^2 p' = E - E' \quad (1a)$$

Hyperboloidal pitch surfaces of this kind have been described in detail in the first of my articles entitled "Basic relationship of hypoid gears" printed in "American Machinist" in 1946.

They are different from the kinematic pitch surfaces, where each is the locus of the instantaneous axis. The pitch surface 31 of the pinion has a larger diameter and taper than its kinematic pitch surface. Relative sliding at points of element 33 is then at an angle to said element.

Assumption of the pitch surfaces for a given tooth ratio also determines the pitch lines. These should extend in the direction of relative sliding at all points of element 33. They can be described on the rotating pitch surfaces by a point moving along element 33, and contact each other at the describing point. Uniform rotation of the pitch surfaces calls for a uniform motion of said point along element 33. The pitch lines 28, 29 are uniform-motion spirals.

Figure 3:
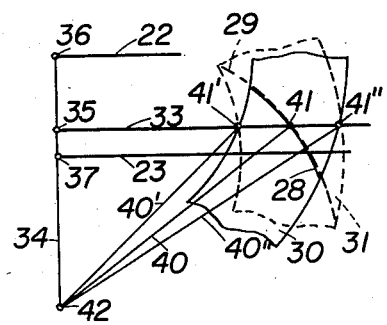
Fig. 3 is a view and diagram further showing the pitch surfaces of Fig. 2, the view being taken at right angles to the straight line of contact of the hyperboloidal pitch surfaces, along a plane parallel to the axes of the gear pair.

At their intersection with contact element 33 they have a direction at right angles to normals that lie in the drawing plane of Fig. 3. The normal 40 at mean point 41 intersects the line of centers 34 at 42. All other normals at points of element 33 also pass through point 42, according to a known property of these pitch spirals. Thus the normals 40', 40" at points 41', 41" respectively pass through point 42.

These normals are inclined to each other, and thereby indicate a varying inclination of the pitch spirals to element 33. The inclination or spiral angle depends on the distance $B=35\text{---}42$ and on the distance of the considered pitch point from point 35. Thus at point 41 the trigonometric tangent of the spiral angle $s=41\text{---}42\text{---}35$ is $$\tan s = \frac{35\text{---}41}{B}$$

B may be computed as follows:

$$B = \frac{E'' \sin p'' + E'm \sin p'}{m \sin p' - \sin p''}$$

Herein $m$ denotes the tooth ratio $N/n$ of the gear and pinion respectively.

For the usual case of right shaft angles, $p=90$ deg., $B=B_r$, the equation becomes $$B_r = \frac{E'' \cos p' + E'm \sin p'}{m \sin p' - \cos p'}$$

The linear pitch along the contact element 33 is constant and is found to be $$p_e = 2\pi \frac{\sin p''}{N}(B+E'') = 2\pi \frac{\sin p'}{n}(B-E')$$

These data completely determine the pitch lines on the assumed pitch surfaces.

The side surfaces of the pinion teeth are now very simply defined. They contain the said pitch lines, and have straight profiles 46, 47 (Fig. 5) in a plane 45 that contains the contact element 33 and is parallel to the pinion axis. Plane 45 is offset from the pinion axis 23 a distance $E'=35\text{---}37$, and lies between the two axes 22, 23. It is the sectional plane of the right half of Fig. 5.

Because of the constant pitch along element 33, the straight profiles 46, 47 have a constant pitch also in any other direction of plane 45. They have a constant pitch 26a, 27a respectively in the direction of the pinion axis 23. And the tooth surfaces of the pinion are helical surfaces of constant pitch and constant lead.

In designing a pair of hypoid gears of the present invention, the pitch angles $p'$, $p''$ are determined like the pitch angles of a bevel-gear pair, whose tooth ratio is an assumed percentage of the tooth ratio $m=N/n$ of the hypoid pair. This percentage is preferably picked from a graph, and determines the distance B or $B_r$ and the spiral angles of the teeth. The offsets $E'$ and $E''$ are computed with Equations 1 or 1a. Thus the gear blanks are arrived at in a very simple manner, as their taper does not have to be adapted to a given cutter diameter.

Also exact pitch lines are used, which are identical on both sides of the teeth, and therefore provide exactly the same pitch-line overlap on both sides. The mesh and successive contact of the gear pair on opposite sides of the teeth is along two surfaces of action which both contain the contact element (33) of the pitch surfaces, and which intersect along said element.

Gear pairs constructed according to the present invention have a constant pitch along a straight line offset from both axes (22, 23) and disposed at an angle to each of said axes. The smaller member or pinion has helical surfaces of constant axial pitch and lead, or briefly helical surfaces. The term helical surface, without modifying addition, is here used throughout the specification and claims to designate a helical surface of constant axial pitch and constant lead.

The helical tooth surfaces of the pinion moreover contain straight-line profiles in planes parallel to and equally offset from the pinion axis.

Figure 4:
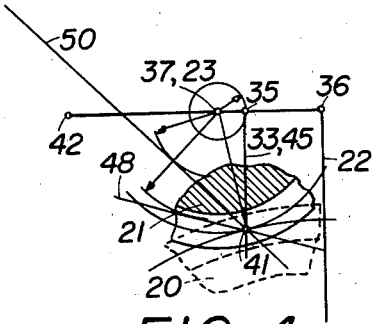
Fig. 4 is a section taken along lines 4—4 of Fig. 2, and a view in the direction of the pinion axis, looking from the large end.

The tooth surface normals at all points of the contact element 33 differ from the normals 40, 40', 40" that lie in the drawing plane of Fig. 3, and that intersect the line of centers 34 at 42. The tooth surface normals of opposite tooth sides pass on opposite sides of the line of centers 34. Fig. 4 shows the tooth-surface normals 48, 50 at mean point 41 of opposite tooth sides. They are both offset from point 42 and pass on opposite sides of it. They are differently offset from the axis 23 of the pinion; and their offset is different from the offset (E') of plane 45 that contains the straight-line profiles of the helical tooth sides. Also plane 45 is offset to the opposite side from the pinion axis 23 than at least one or both of the normals 48, 50.

The gear 20 is conjugate to the described pinion. By that is meant that uniform motion is transmitted in the gear pair. In a fixed running position of the gears and at light load the tooth contact may sweep the entire tooth surfaces as the gears turn. Or preferably the tooth surfaces of at least one member of the gear pair are slightly eased off at their ends and at the ends of their profiles, as is common practice. The tooth contact then does not extend quite to the boundaries of the tooth surfaces at a light load, and the gears are less sensitive to slight displacements and to deflections under load, and to manufacturing tolerances. The ease-off consists in removing a very slight amount of stock from the region of the tooth surface boundaries.

Production

The preferred way of producing both members of this hypoid pair is by form-cutting. Indeed the design is adapted to form-cutting. A suitable form-cutting method and machine is described in my application Serial No. 557,151, filed January 3, 1956. Further tools and machine structure are described in my application Serial No. 581,088, filed April 27, 1956.

Preferably a plurality of tools are used which act simultaneously on a gear blank from different sides.

Figure 6:
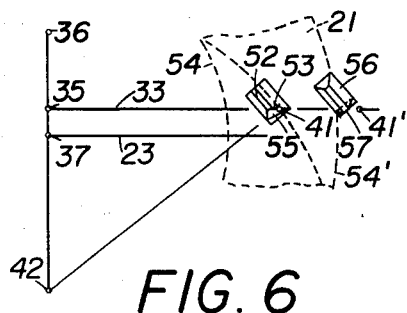
Figures 6 and 7 are diagrams illustrating a method of form-cutting the tapered pinions. They refer to cutting opposite sides of the pinion teeth respectively.
Figure 7:
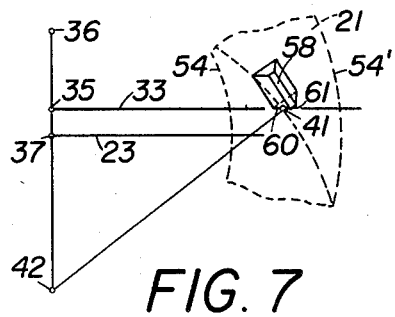

Figures 6 and 7 illustrate a procedure for cutting opposite sides of the pinion teeth. The drawing plane of Figures 6 to 11 is the same as that of Fig. 3. The pinion is considered disposed chiefly above the drawing plane.

Figure 5:
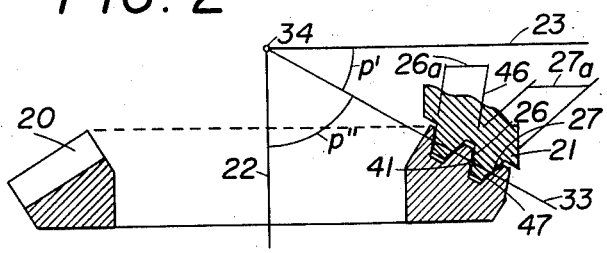
Fig. 5 is a section taken along lines 5—5 of Fig. 1, looking in the direction of the arrows.

Tool or blade 52 has a straight side-cutting edge 53 which matches the straight profile (46) of the longitudinally concave side (26) of the pinion teeth (25), shown in Fig. 5. In the mean tool position shown, edge 53 intersects the contact element 33 at mean point 41. During the finishing operation tool 52 is moved along element 33 from the inner end 54 of the teeth to their outer end 54', while the pinion blank turns on its axis (23) in the prescribed proportion to the displacement of the tool. It thus describes the entire tooth side in a single pass. The cutting face 55 has a suitable amount of side-rake to effect a keen cutting edge 53. Its end edge however has of necessity a somewhat obtuse cutting angle.

To obtain efficient and clean cutting at the tooth bottom adjacent the end of edge 53, a further blade 56 is provided. It cuts chiefly with its end-cutting edge 57. It is shown ahead of blade 52 along element 33. This is done however for convenience of illustration. Blade 56 may operate on a different part of the circumference of the pinion blank in the same axial position as blade 52. The upper corner of the end-cutting edge 57 is then in a different tooth space in the same position to mean point 41 as the upper corner of blade 52, and as the upper corner of the shown blade 56 is from pitch point $41_a$. The latter is an integral number of pitches $p_e$ away from point 41.

In each case the upper corner of blade 56 traces the same path on the work piece as the upper corner of blade 52, or a path somewhat beyond it. The end-cutting edge 57 takes a clean cut, as the cutting face of blade 56 is positioned to suit this end-cutting edge.

Blade 58 of Fig. 7 has a straight side-cutting edge 60 which matches the straight profile 47 of the longitudinally convex side 27 of the pinion teeth. The cutting face of this blade also provides a keen end-cutting edge 61, so that the use of an extra blade to cut the tooth bottom is here less required. Blade 58 is moved along element 33 from the inner end 54 to the outer end 54' of the teeth, while the pinion blank (21) turns on its axis in proportion to the displacement of blade 58.

Figure 8:
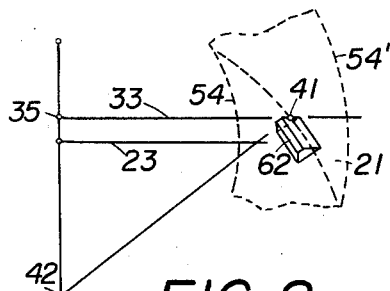
Figures 8 and 9 are diagrams similar to Figures 6 and 7, showing tools for cutting in the opposite direction.
Figure 9:
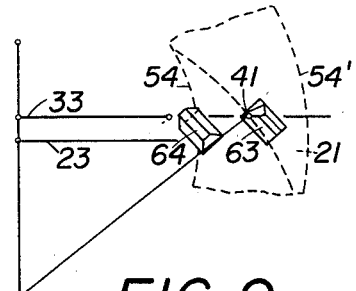

Figures 8 and 9 show a pair of side-cutting blades 62, 63 adapted to cut while moving along contact element 33 from the outer end 54' of the teeth to their inner end 54. The side-cutting edges of the blades 62, 63 are identical with the side-cutting edges 53, 60, but the blades face in the opposite direction, as compared with blades 52, 58. Here also an extra blade (64) is required at least with side-cutting blade 63, to provide a clean bottom cut.

It is seen that cutting the pinion is simple and straightforward, its tooth profiles in a given plane being constant and straight.

Figure 10:
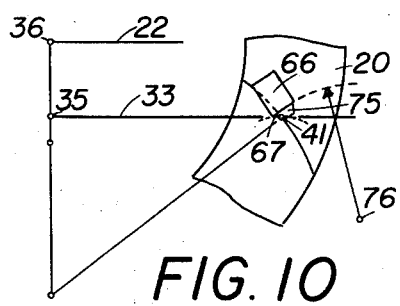
Figures 10 and 11 are diagrams similar to Figures 6 and 7, but which refer to cutting opposite sides of the teeth of the mating gear, that has convex tooth profiles.
Figure 11:
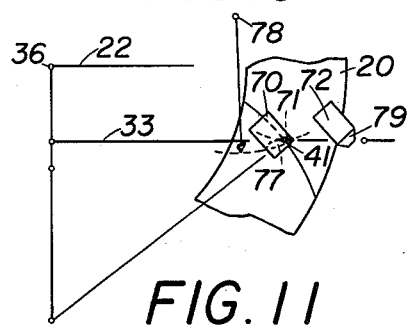

Figures 10 and 11 illustrate the cutting of opposite sides of the teeth of the gear, which is conjugate to the helical tooth sides of the pinion. The gear, shown fragmentarily at 20, is considered disposed principally below the drawing plane of these figures.

Tool or blade 66 is moved along element 33 like blade 52 of Fig. 6, while the gear blank (20) turns on its axis 22 in direct proportion to the tool displacement. Blade 66 moves through one pitch $p_e$ along said element per turning motion of the gear blank through one pitch, that is per $1/N$ of a full turn, N being the tooth number. Its side-cutting edge 67 cuts the longitudinally convex side of the gear teeth, the side that meshes with the pinion tooth sides produced by blade 52. Edge 67 intersects element 33 at the same point 41 as edge 53 of blade 52, and is tangent to edge 53 at that point. Its tangent at that point coincides with the straight edge 53. Edge 67 is however concavely curved.

Tool or blade 70 of Fig. 11 cuts the longitudinally concave side of the gear teeth, as it moves along element 33 like blade 58 of Fig. 7, while the gear blank turns on its axis in proportion. Its side-cutting edge 71 is tangent to the straight edge 60 of blade 58, at its intersection 41 with element 33. It is concavely curved. A depth-cutting blade 72 is preferably added at least to blade 70. The blades 66, 70, 72 preferably act simultaneously in different tooth spaces of the gear blank, at approximately the same level or position lengthwise of the respective element 33. They start cutting about simultaneously, and end their cuts also about simultaneously in each cutting stroke.

The required profile curvature of the gear teeth can be computed, or it can be experimentally determined. One experimental procedure consists in cutting a gear of suitable material with an assumed profile curvature, and then rolling it together with a given hard pinion under load. The conjugate tooth shape is then rolled onto the gear if its material is relatively soft.

If the profile curvature is to be computed, the procedure may be as follows: Several pitch points (41 etc.) of the contact element 33 are considered. At each of these points the tangent plane of the tooth surface is determined, which is the same on the pinion and gear. The mesh is analogous to the mesh of a helical worm. The instantaneous line of contact between the gear and a considered helical tooth surface is the normal projection to said surface of an axis parallel to the gear axis, on right-angle drives. The distance R of this axis from the gear axis depends on the axial pitch $p_a$ of the helical surfaces, that is on distance 26a or 27a (Fig. 5).

$$R = \frac{p_a N}{2\pi}$$

$N$=tooth number of gear.

This helical mesh permits to determine the direction of the line of contact at the considered pitch point, and its inclination to the pitch-line tangent. The relative curvature between the contacting tooth surfaces can now be computed from this inclination, the position of the tooth tangent plane, and the relative curvature of the hyperboloidal pitch surfaces. And the actual curvature is obtained by allowing for the curvature of the known helical surface of the pinion.

Whether computed or arrived at by trial, it is found that the tooth-profile curvature of normal sections through the pitch points should change along the teeth, the curvature generally decreasing from the inner end 54 to the outer end 54' of the teeth. That is their curvature radii increase. The said normal sections are at right angles to the pitch lines and to the tooth direction at the considered point.

It is possible to use a constant or approximately constant curvature radius, which then should be equal to the smallest curvature radius occurring on the length of the pitch lines. The gear teeth then have approximately constant profiles in their normal sections. Gears so constructed may transmit uniform motion, but have a tooth-bearing area of varying width that decreases sharply towards the outer end of the teeth. Such gears do not make full use of their tooth surfaces.

The tooth-profile curvature of normal sections should change along the teeth. How this can be achieved by form-cutting has been completely described in my said application Serial No. 557,151.

Its principles will now be outlined. Advantage is taken of the side-clearance variation of the blades as they move along the teeth, for instance from point 41' to point 41" of Fig. 3, and beyond. As the blade has a constant position with respect to the direction of element 33, the side-clearance angle changes by about an angle 41'—42—41" between tool positions 41' and 41".

The side-cutting edges 67 and 71 of blades 66 and 70 have prescribed tangents at the pitch points, but their curvature planes at said points may be determined at will. The curvature plane at a point of any curve, also of a three-dimensional curve, has a well known mathematical meaning. A given curved cutting edge produces normal tooth profiles whose curvature increases with increasing inclination of the curvature plane of said edge to the pitch line and to the direction of the teeth. The curvature plane is so chosen that said inclination is smallest at position 41". At position 41' the inclination is larger by about angle 41'—42—41". The inclination is so determined that its increase produces the required increase in curvature of the normal tooth profile.

In principle the curvature plane could also be made the cutting face. This would ordinarily result in impractical or impossible cutting angles. The last-named application shows how the desired cutting angles can be attained by using spherical cutting faces. Thus tool or blade 66 has a concave spherical cutting face 75 centered at 76. Tool 70 has a convex spherical cutting face 77 centered at 78. The depth-cutting blade 72 may have a plane cutting face 79.

A form-cut gear so produced has a constant profile curvature in planes increasingly inclined to the tooth direction with increasing distance from the outer end of the teeth. These planes have a constant inclination to element 33 and to the gear axis 22. The gear has a varying profile curvature in planes normal to its teeth.

While I have shown teeth of constant depth from end to end, teeth of tapering depth may also be used, if desired. Also teeth with or without ease-off or crowning may be used.

*Modification*

Figure 12:
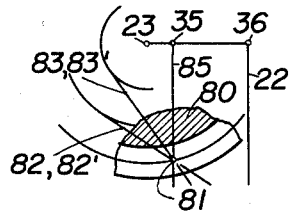
Fig. 12 is a section and axial view similar to Fig. 4, showing a tapered pinion constructed according to a modification.

Fig. 12 is a view similar to Fig. 4, taken axially of the pinion 80. 82, 83 are the projected tooth surface normals of opposite tooth sides, at mean point 81. The tooth surfaces of pinion 80 are also helical surfaces that have straight profiles in planes parallel to and offset from the pinion axis 23. Here however the straight-line profiles of the helical surfaces lie in planes 82', 83' which contain the respective tooth-surface normals 82, 83 and are parallel to the pinion axis 23. All the surface normals at points of said profiles also lie in the respective planes 82', 83'. Helical surfaces with these properties are known as involute helicoids.

The tooth surfaces of a conjugate gear pair containing pinion 80 may also be produced by the efficient process of form-cutting. They lend themselves furthermore to production by single-threaded taper hobs and by other processes.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A pair of gears having angularly disposed and offset axes, comprising a gear and a tapered pinion of smaller outside diameter than said gear, said pinion having on both sides of its teeth helical tooth surfaces of straight profile in a plane parallel to and offset from its axis, said plane being the same on both sides of said teeth, the axial pitch of said tooth surfaces being constant and different on said two sides, and said gear being conjugate to said pinion.

2. A tapered pinion having a plurality of coaxial helical tooth surfaces of constant axial pitch provided at least on the longitudinally convex sides of its teeth, said helical surfaces having straight profiles in a plane parallel to the pinion axis and offset therefrom to one side, the mean surface normal of each of said surfaces being offset to the opposite side from the pinion axis, in a view along said axis.

3. A tapered pinion having a plurality of coaxial helical tooth surfaces of constant axial pitch provided on at least one side of its teeth, said helical surfaces having straight profiles in a plane parallel to the pinion axis and offset therefrom, the mean tooth-surface normals of said helical surfaces being differently offset from said axis.

4. A tapered pinion having a plurality of coaxial helical tooth surfaces of constant axial pitch provided on each of the two sides of its teeth, all said helical surfaces having a straight profile in a plane parallel to and offset from the pinion axis, the mean tooth-surface normals of opposite tooth sides being differently offset from said axis, and each having an offset different from the offset of said plane.

5. A pair of gears having angularly disposed and offset axes, comprising a gear and a tapered pinion of smaller outside diameter than said gear, said pinion having coaxial helical tooth surfaces of constant axial pitch on at least one side of its teeth, said surfaces having straight profiles in a plane parallel to and offset from the axis of said pinion, the surface normals at points of said profiles extending in said plane, so that said surfaces are involute helicoids, and said gear being conjugate to said pinion.

6. A pair of hypoid gears having offset axes disposed at right angles, comprising a tapered gear and a tapered pinion of smaller outside diameter than said gear, said pinion having a plurality of teeth with coaxial helical tooth surfaces of constant axial pitch on both sides of said teeth, said axial pitch being different on said two sides, said surfaces of each side having straight profiles in a plane parallel to and offset from the axis of said pinion, the surface normals at points of said profiles extending in said plane, so that said surfaces are involute helicoids, and said gear being conjugate to said pinion.

7. A pair of gears having angularly disposed and offset axes, comprising a gear and a tapered pinion of smaller outside diameter than said gear, said pinion having coaxial helical side tooth surfaces of constant axial pitch, and said gear having teeth of constant profile curvature in planes having a varying inclination to the direction of the teeth and a constant inclination to the axis of said gear, so that it is adapted to be form-cut.

8. A pair of gears having angularly disposed and offset axes, comprising a gear and a tapered pinion of smaller outside diameter than said gear, said pinion having coaxial helical side tooth surfaces of constant axial pitch, and said gear having teeth of varying profile curvature in planes normal to the teeth and of constant profile curvature in planes of constant inclination to the axis of said gear, so that it is adapted to be form cut.

9. A pair of gears having angularly disposed and offset axes, comprising a gear and a tapered pinion of smaller outside diameter than said gear, said pinion having coaxial helical side tooth surfaces of constant axial pitch, said surfaces having straight profiles in a plane parallel to and offset from the axis of said pinion, and the teeth of said gear having a constant convex profile curvature in planes having a varying inclination to the direction of its teeth and a constant inclination to the axis of said gear, so that it is adapted to be form cut.

References Cited in the file of this patent

UNITED STATES PATENTS

| | | |
|---|---|---|
| 1,693,740 | Wildhaber | Dec. 4, 1928 |
| 1,826,852 | Wildhaber | Oct. 13, 1931 |
| 2,696,125 | Saari | Dec. 7, 1954 |
| 2,776,578 | Saari | Jan. 8, 1957 |